(12) United States Patent
Nemeth et al.

(10) Patent No.: US 7,715,986 B2
(45) Date of Patent: May 11, 2010

(54) METHOD FOR IDENTIFYING AND REMOVING MULTIPLES FOR IMAGING WITH BEAMS

(75) Inventors: Tamas Nemeth, San Ramon, CA (US); Yue Wang, San Ramon, CA (US); Fuhao Qin, Spring, TX (US); Ross Hill, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 215 days.

(21) Appl. No.: 11/751,975

(22) Filed: May 22, 2007

(65) Prior Publication Data

US 2008/0294346 A1 Nov. 27, 2008

(51) Int. Cl.
- *G01V 1/00* (2006.01)
- *G01V 1/28* (2006.01)
- *G01V 1/38* (2006.01)

(52) U.S. Cl. .................... 702/14; 702/16; 702/17; 703/5; 367/24; 367/73

(58) Field of Classification Search ................ 702/14, 702/16, 17; 703/5; 367/73, 24
See application file for complete search history.

(56) References Cited

U.S. PATENT DOCUMENTS

| | | | | |
|---|---|---|---|---|
| 4,887,243 | A * | 12/1989 | Pann | ............................ 367/24 |
| 5,274,605 | A | 12/1993 | Hill | |
| 5,986,973 | A | 11/1999 | Jericevic et al. | |
| 6,169,959 | B1 | 1/2001 | Dragoset, Jr. | |
| 6,507,787 | B1 | 1/2003 | Filpo Ferreira Da Silva et al. | |
| 6,519,533 | B1 * | 2/2003 | Jeffryes | ........................ 702/17 |
| 6,735,527 | B1 * | 5/2004 | Levin | ........................... 702/14 |
| 6,832,161 | B1 | 12/2004 | Moore | |
| 7,149,630 | B2 | 12/2006 | Abma | |

OTHER PUBLICATIONS

Berryhill et al., Deep-Water Peg Legs and Multiples: Emulation and Suppression, Geophysics, 1986 Society of Exploration Geophysicists, Dec. 1986, pp. 2177-2184, vol. 51, No. 12.

Zhao et al., Application of a Model-Based Multiple Attenuation Method to a Gulf of Mexico Deepwater Dataset, The Leading Edge, Mar. 2005, pp. 285-290.

Lu et al., Model-Based Removal of Water-Layer Multiple Reflections, Geophysics, 1999 Society of Exploration Geophysicists. Nov.-Dec. 1999, pp. 1816-1827, vol. 64, No. 6, 18 Figures.

(Continued)

*Primary Examiner*—Carol S Tsai
*Assistant Examiner*—Janet L Suglo
(74) *Attorney, Agent, or Firm*—Maurice Teixeira; Torrey A. P. Turner (57) ABSTRACT

The present invention incorporates the use of model-driven and data-driven methodologies to attenuate multiples in seismic data utilizing a prediction model which includes multiply-reflected, surface-related seismic waves. The present invention includes beam techniques and convolving a predicted multiples beam with a segment of a modeled pegleg beam to obtain a convolved multiples beam. The convolved multiples beam can then he deconvolved to attenuate the multiples that are present in the original input beam.

45 Claims, 11 Drawing Sheets

OTHER PUBLICATIONS

Pica et al., 3D Surface-Related Multiple Modeling, Principles and Results, SEG/Houston 2005 Annual Meeting, SPMUL 1.5, pp. 2080-2084.

Pica et al., 3D Surface-Related Multiple Modeling, The Leading Edge, Mar. 2005, pp. 292-296.

Reshef et al., Multiple Prediction Without Prestack Data: An Efficient Tool for Interpretive Processing, Technical Article, First Break, 2003 EAGE, Mar. 2003, pp. 29-37, vol. 21.

Hill et al., Beam Methods for Predictive Suppression of Seismic Multiples in Deep Water, SEG International Exposition and $72_{nd}$ Annual Meeting, Main Menu. pp. 1-4.

Stork et al., Predicting and Removing Complex 3D Surface Multiples with WEM Modeling—An Alternative to 3D SRME for Wide Azimuth Surveys?, SEG/New Orleanse 2006 Annual Meeting, pp. 2679-2683.

Verschuur et al., Adaptive Surface-Related Multiple Elimination, Geophysics, 1992 Society of Exploration Geophysicists, Sep. 1992, pp. 1166-1177, vol. 57, No. 9, 12 Figures.

Wiggins, Attenuation of Complex Water-Bottom Multiples by Wave-Equation-Based Prediction and Subtraction, Geophysics, 1988 Society of Exploration Geophysicists, Dec. 1988, pp. 1527-1539, Volumbe 53, No. 12, 9 Figures.

Wiggins, Multiple Attenuation by Explicit Wave Extrapolation to an Interpreted Horizon, The Leading Edge, Jan. 1999, pp. 46-54.

\* cited by examiner

METHOD FOR IDENTIFYING AND REMOVING MULTIPLES FOR IMAGING WITH BEAMS

BACKGROUND OF THE INVENTION

This invention relates to seismic exploration and processing, and more specifically to imaging with beams and a method to predict multiples based on primaries by combining both model-driven and data-driven methodologies.

In the petroleum industry, seismic prospecting techniques are commonly used to aid in the search for and the evaluation of subterranean hydrocarbon deposits. In seismic prospecting, one or more sources of seismic energy emit waves into a subsurface region of interest such as a geologic formation. These waves enter the formation and may be scattered, e.g., by reflection or refraction, by subsurface seismic reflectors (i.e., interfaces between underground formations having different elastic properties). The reflected signals are sampled or measured by one or more receivers, and the resultant data are recorded. The recorded samples may be referred to as seismic data or a set of "seismic traces". The seismic data may be analyzed to extract details of the structure and properties of the region of the earth being explored.

Seismic prospecting consists of three separate stages: data acquisition, data processing and data interpretation. The success of a seismic prospecting operation depends on satisfactory completion of all three stages.

In general, the purpose of seismic exploration is to map or image a portion of the subsurface of the earth (a formation) by transmitting energy down into the ground and recording the "reflections" or "echoes" that return from the rock layers below. The energy transmitted into due formation is typically sound and shear wave energy. The downward-propagating sound energy may originate from various sources, such as explosions or seismic vibrators on land or air guns in marine environments. Seismic exploration typically uses one or more energy sources and typically a large number of sensors or detectors. The sensors that may be used to detect the returning seismic energy are usually geophones (land surveys) or hydrophones (marine surveys).

During a surface seismic survey, the energy source may be positioned at one or more locations near the surface of the earth above a geologic structure or formation of interest, referred to as shotpoints. Each time the source is activated, the source generates a seismic signal that travels downward through the earth and is at least partially reflected from discontinuities of various types in the subsurface, including reflections from "rock layer" boundaries. In general, a partial reflection of seismic signals may occur each time there is a change in the elastic properties of the subsurface materials. Reflected seismic signals are transmitted back to the surface of the earth, where they are recorded as a function of traveltime at a number of locations. The returning signals are digitized and recorded as a function of time (amplitude vs. time).

One prevalent issue with the seismic energy recorded by the receivers during the data acquisition stage is that the seismic traces often contain both the desired seismic reflections (the "primary" reflections) and unwanted multiple reflections which can obscure or overwhelm the primary seismic reflections. A primary reflection is a sound wave that passes from the source to a receiver with a single reflection from a subsurface seismic reflector. A multiple reflection is a wave that has reflected at least three times (up, down and back up again) before being detected by a receiver. Depending on their time delay from primary events with which they, are associated, multiples are commonly characterized as short-path, implying that they interfere with their own primary reflection, or long-path, where they appear as separate events.

There are also a variety of multiple events which are well known in the art. There are signals which are "trapped" in the water layer between two strong reflectors, the free surface and the bottom of the water layer. There are "peg-leg" multiple events, which are reflections that are characterized by an additional roundtrip through the water layer just after emission or just before detection. There are "remaining" surface-related multiple events, where the first and last upward reflections are below the first (water) layer, and there is at least one reflection at the free surface in between. There are also "interbed" multiples which has a downward reflection occurring from a subsurface reflector.

In most cases, multiples do not contain any useful information that is not more easily extracted from primaries. Moreover, water-bottom multiples have been recognized as the most serious noise problem in seismic data processing in many offshore areas. Multiples can severely mask primary reflection events for structural imaging and contaminate Amplitude vs. Offset ("AVO") information. For those reasons, removal of multiples, or at least attenuation of multiples is a necessary part of the seismic data processing stage in many environments, particularly in marine settings where multiples are especially strong relative to the primaries.

In the case of deep-water data, suppression of first-order and the next few orders of sea-bottom multiple and peg-leg reflections are of great importance. These rather strong multiples may have the same travel time as the primary reflections of target reflectors.

There are several prior art methods to attenuate multiples depending on the attributes of the multiples utilized. One class of multiple attenuation methods is the predictive methods where the multiples are predicted from their respective primaries. Prior art predictive multiple attenuation techniques can be generally divided into two categories; model-driven methodologies and data-driven methodologies. Model-driven methodologies generally use an earth model and the recorded data to predict or simulate multiples utilizing the estimated sea-bottom reflectivity function and calculated amplitude functions to model water-layer multiple reflections, those predicted multiples are then subtracted from: the original data. Other model-driven technologies utilize an earth model or reflectivity model to predict the stationary multiples. The data-driven methodologies exploit the fact that primaries and multiples are physically related through a convolutional relationship and predict multiples by crossconvolving the relevant primaries thought to contain the stationary contributions for multiples. Data-driven methodologies can generally handle complex geometries and need little or no information about the properties of the subsurface. The model-based technologies are typically cost-effective compared to data-driven technologies, while the latter are typically more flexible.

Some model-driven methodologies require structural information, i.e., information about the subsurface structure, the determination of which is the reason for doing seismic exploration in the first place. Other model-driven methodologies require the shape of the source wavelet that will not be a pure delta function because of the reverberations and frequency bandwidth limitation. Some model-driven methodologies require both structural and source wavelet information while others use a matching filter to account for a distorted source wavelet.

Data-driven methodologies rely on the predictability of multiples from primary components. In effect, that methodology utilizes existing seismic data to generate multiples and those generated multiples are then subtracted from the existing data. One such prior art methodology that is data-driven is known as "surface-related multiple elimination" or "SRME". In brief, this method operates by utilizing the existing data to create a dataset that contains only predictions of the multiples that are present in the data. Specifically, the method seeks to predict the seismic expression of multiples, and after adaptation to the existing multiples in the data the predicted multiples are subtracted from the original data leaving behind (at least theoretically) only the primary energy.

Data-driven SRME techniques are attractive solutions for predicting multiples in complex geologic settings, they do no require any a-priori knowledge of the subsurface (reflectivity, structures and velocities). However, these methods do require one shot location for each receiver position, and this is not the case for most three dimensional ("3D") acquisition geometries. SRME methodologies are generally challenged by complex 3D multiples because of large shot spacing, narrow spread length and/or wide cable spacing. The missing data can be interpolated or extrapolated from the existing data, but interpolation of extrapolation has trouble with aliased seismic data caused by the large shot and/or receiver spacing. Advanced interpolation or extrapolation methods can also be difficult to implement and expensive. A common cause of these complex 3D data that challenge 3D SRME methods is rugosity on the top of salt. But, any type of complex overburden can cause complex 3D seismic data that is hard to interpolate.

Another data-driven methodology utilizes predictive deconvolution which is a filtering method that assumes that multiples are periodic while primaries are not. This assumption is usually met for data from water depths less than 500 msec (approximately 1,200 feet) and approximately layered subsurface geology. In areas of water depths greater than 500 msec where the velocity difference between primaries and multiples are significant, velocity-filtering methods (as opposed to predictive methods) such as tau-p and f-k filtering can be used, where the variable f represents frequency, k represents the wave-number, p represents the ray parameter, and tau represents the zero offset intercept time.

However, filtering methods generally require determination, or at least an educated guess, of the apparent wave propagation velocities in the subsurface media through which the reflected seismic waves pass in their journey from the seismic source to a receiver. These velocities can differ significantly due to the combination of the variations of the subsurface structure and rock properties. In addition, predictive deconvolution often leads to inadvertent damage to the primaries due to the difficulty in separating the multiples and primaries. Moreover, predictive deconvolution often fails to take into account the nonlinear factor in the reflectivity, which are generally caused by peg-leg multiples.

One prior art method which has extended predictive deconvolution for applications in deep water has utilized beam techniques. That method applies local slant stacking (or other dip-discriminating methods) to the data to decompose the recorded wavefields into beam components. These components travel approximately along raypaths. Simple raytracing within the water layer describes the long-period reverberations and relate primary and multiple events occurring in the beam components of the wave-field. Based on the information from the raytracing the time series of the beam-component of the primary can be shifted according to raytraced traveltimes and then analyzed with a multi-channel prediction filter. The predicted time series is considered as multiple energies and is removed from the beam components of the original data after a multi-channel matched filtering.

Figure 1:
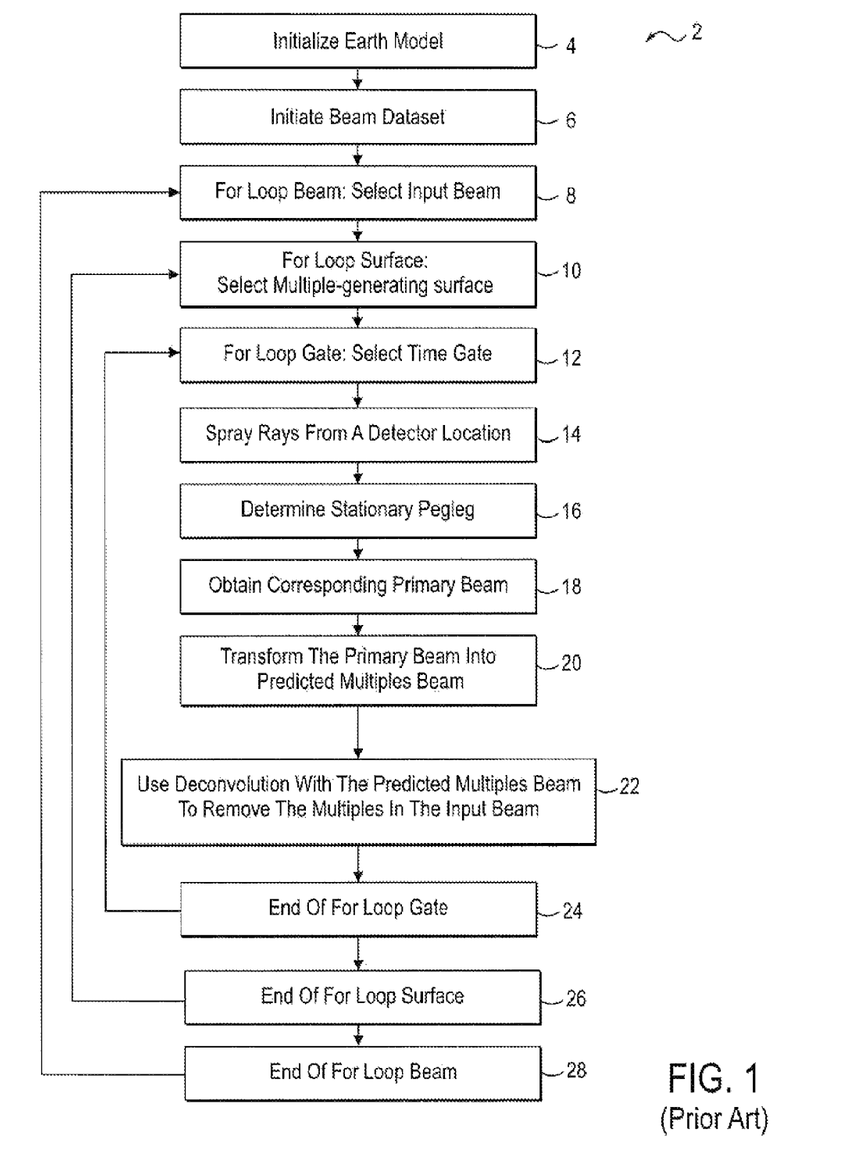
FIG. 1 illustrates a flow chart of a prior art method of attenuating multiples in seismic data.

FIG. 1 illustrates a flowchart for one example of a prior art method 2 wherein deconvolution is utilized with a beam technique for attenuating multiples. The prior art method includes initializing an earth model 4 which relates to a geological region of interest, and initiating a beam dataset 6 that has been determined from seismic data of the geological region of interest. The prior art method further includes a series of loops wherein an input beam 3, a multiple-generating surface 10 and a time gate 12 are selected. One or more time gates (or windows) are selected to ensure that the signal within each gate is stationary. Trial rays are then "sprayed" from a detector location 14 and a stationary pegleg is determined 16. The stationary pegleg is the pegleg that satisfies the Snell's law for reflection at the multiple-generating surface. A primary beam corresponding to the stationary pegleg is obtained 13, and the primary beam is transformed into a predicted multiples beam 20. The predicted multiples beam is then deconvolved to remove multiples which are present in the input beam 22. Deconvolving the predicted multiples beam to remove the multiples in the input beam 22 can occur within the loop for selecting the time gate 24, the loop for selecting the surface 26, or the loop for selecting the input beam 28.

While the beam techniques have improved prior art multiple attenuation techniques, there is still a need for an improved method which provides a more accurate prediction of multiples and therefore allows for more accurate subtraction of those multiples from the data. The prior beam techniques assume that there is a single dominant multiple-generating surface 10 and the predicted multiples beams are related only to this multiple-generating surface 10 and do not contain predicted multiples from other multiple-generating surfaces. The current invention improves prior art beam techniques to incorporate predicted multiples beams from multiple-generating surfaces that were not explicitly utilized to determine to stationary peglegs.

SUMMARY OF THE INVENTION

The present invention overcomes the above-described and other shortcomings of the prior art by providing a novel and improved method of predicting multiples based upon primaries which combines features from both model-driven and data-driven methodologies. It is accomplished by determining a model-driven stationary prediction based on the earth model and augmenting that prediction by a data-driven prediction around the stationary prediction. It should be appreciated that the model-driven stationary prediction can be replaced by an a-priori determination, of stationary predictions, such as assuming a layered model.

One embodiment of the present invention includes a method for generating a prediction model of multiply-reflected, surface-related seismic waves which includes initializing an earth model related to a geological volume and selecting a beam dataset derived from seismic data related to the geological volume. The method also includes selecting an input beam from the beam dataset; a multiple-generating surface from the earth model, and a time gate. A stationary pegleg is determined utilizing the input beam, the multiple generating surface and the time gate. A primary beam which corresponds to the stationary pegleg is then obtained, and a modeled pegleg beam related to the primary beam is determined. The modeled pegleg beam is convolved with the primary beam to generate a convolved multiples beam. The convolved multiples beam is compared with the input beam to remove the multiples in the input beam by matched filtering.

The convolved multiples beam is utilized to provide a more accurate method of predicting and removing multiples than prior art methods. The step of convolving the modeled pegleg beam with the primary beam is not included in the prior art methods, and enables the present invention to more accurately predict multiples. For example, in one embodiment of the present invention convolving the primary beam and the modeled pegleg beam to obtain the convolved multiples beam includes transforming the primary beam into a predicted multiples beam by travel time shifting, and convolving the predicted multiples beam with a segment of the modeled pegleg beam to obtain a convolved multiples beam, the segment of the modeled pegleg beam starting at the multiple-generating surface and ending at a detector location.

"Convolution" is known in the art. In general, it is a mathematical operation on two functions that represents the process of linear filtering. Convolution can be applied to any two functions of time or space (or other variables) to yield a third function, the output of the convolution. Although the mathematical, definition is symmetric with respect to the two input functions, it is common in signal processing to say that one of the functions is a filter acting on the other function. The response of many physical systems can be represented mathematically by a convolution. For example, a convolution is commonly used to model the filtering of seismic energy by the various rock layers in the Earth.

One embodiment of the present invention determines the stationary pegleg utilizing rays which are sprayed from a detector location, the detector location being based on the input beam, and the stationary pegleg is related to one of the rays sprayed from the detector location.

As one skilled in the art will appreciate, the phrase "time gate" is used herein to describe the entire beam or one of a plurality of segments included in the beam.

It should also be appreciated that utilizing beam techniques to process seismic data are well known in the art, and those techniques are within the scope of the present invention. Beams in general are defined as energy components that are partially localized in space and dip. Some examples of beams are Gaussian beams and other non-Gaussian beams, such as beams with complex rays, controlled beams and beams as a finite-difference solution of some version of the wave equation.

In one embodiment of the present invention, a segment of a modeled pegleg beam is convolved with the predicted multiples beam to generate a convolved multiples beam. The segment of the modeled pegleg beam starts at the multiple-generating surface and involves a time interval that is either explicitly specified or determined by another horizon in the model.

In another embodiment of the present invention, the convolved multiples beam can be obtained by directly convolving the time sequences of the predicted multiples and the predicted modeled pegleg beams.

It should also be appreciated that the present invention is intended to be used with a system which includes, in general, a computer configuration including at least one processor, at least one memory device for storing program code or other data, a video monitor or other display device (i.e., a liquid crystal display) and at least one input device. The processor is preferably a microprocessor or microcontroller-based platform which is capable of displaying images and processing complex mathematical algorithms. The memory device can include random access memory (RAM) for storing event or other data generated or used during a particular process associated with the present invention. The memory device can also include read only memory (ROM) for storing the program code for the controls and processes of the present invention.

Additional features and advantages of the present invention are described in, and will be apparent from, the following Detailed Description of the Invention and the Figures.

BRIEF DESCRIPTION OF THE DRAWINGS

These and other objects, features and advantages of the present invention will become better understood with regard to the following description, pending claims and accompanying drawings where;

DETAILED DESCRIPTION OF THE INVENTION

While this invention is susceptible to embodiments in many different forms, there are shown in the drawings, and will herein be described in detail, preferred embodiments of the invention with the understanding, that the present disclosure is to be considered as an exemplification of the principles of the invention and is not intended to limit the broad aspect of the invention to the embodiments illustrated.

Figure 2:
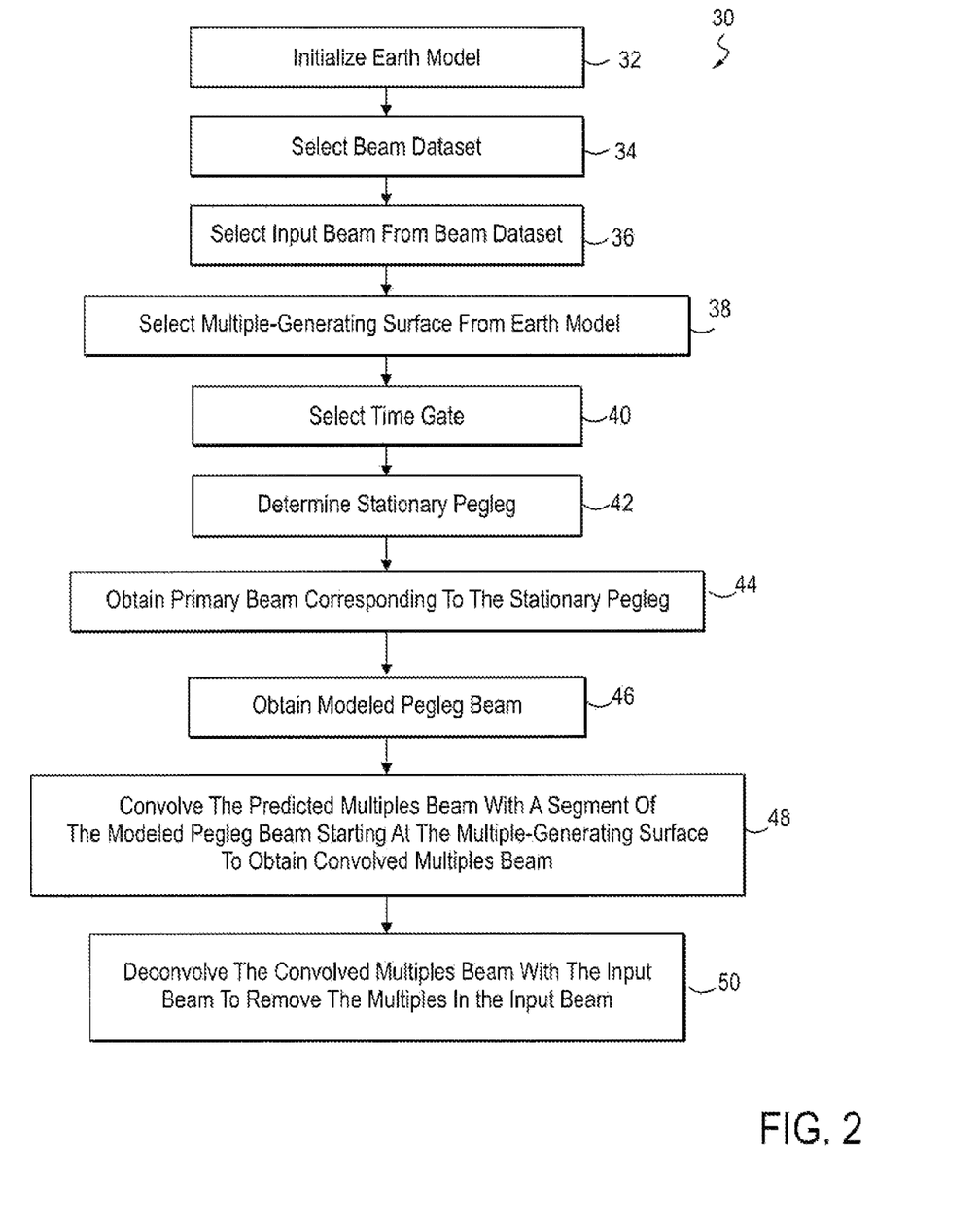
FIG. 2 illustrates a flow chart of one embodiment of the present invention for attenuating multiples in seismic data.

One embodiment of the present invention 30 is illustrated in FIG. 2. The embodiment includes initializing an earth model that corresponds to a geological area of interest 32 and selecting a beam dataset derived from seismic data collected in the geological area of interest 34. An input beam from the beam dataset 36, a multiple-generating surface from the earth model 38, and a time gate 40 are selected. A stationary pegleg is determined utilizing the input beam, the multiple generating surface and the time gate 42. A primary beam corresponding to the stationary pegleg is then obtained 44. A modeled pegleg beam related to the primary beam is obtained 46. The modeled pegleg beam is convolved with the primary beam to determine a convolved multiples beam 48. The convolved multiples beam is deconvolved with the input beam to remove the multiples in the input beam 50.

In another embodiment of the present invention, the predicted primary beam can be directly convolved with the modeled pegleg beam.

In yet another embodiment of the present invention, rays are sprayed from a detector location and the stationary pegleg is determined based upon one of the rays. The detector location in that embodiment is based upon the input beam.

In a further embodiment of the present invention, a segment of the modeled pegleg beam is convolved with the primary beam to obtain a convolved multiples beam. The segment of the modeled pegleg beam starts at the multiple-generating surface and involves a time interval that is either explicitly specified or is determined by another horizon in the model. The convolved multiples beam is then deconvolved with the input beam to remove the multiples in the input beam.

Figure 3:
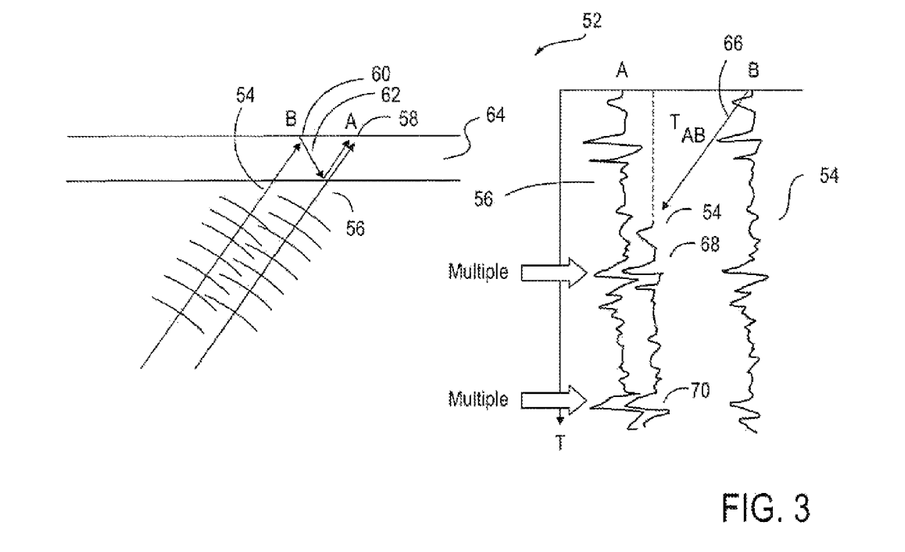
FIG. 3 illustrates one embodiment of the present invention which includes transforming a primary beam into a predicted multiples beam.

As described-above, prior art methods have used local slant stacking or other dip-discriminating methods for seismic traces to separate a recorded wavefield into beam components and those methods are known in the art. The present invention utilizes local slant stacking to separate the recorded wavefield into components that are localized in both position and dip. These components are what would be recorded at the center of a beam arrival 54, 56 at locations A 58 and B 60 as illustrated in method 52 shown in FIG. 3. The beam energy 54 that arrives at location B 60 reverberates in the water layer 64 and is assumed to arrive as multiples 62 within a beam 56 recorded at location A 58. Shifting beam B 54 by the raytrace traveltime $T_{AB}$ 66 from location B 60 to location A 58 will line up the events in beam B 54 with the multiples 68, 70 in beam A 56. Once the events have been aligned and the multiples 68, 70 are identified, the multiples 68, 70 can then be removed.

When the local slant stacking described-above is used for 3D acquisition, the recorded energy cannot be completely steered into beams because the wavefield is not densely sampled along all recording directions, thus there is an issue of missing data or severe aliasing that is needed to accurately determine the raytrace traveltime $T_{AB}$. For example, as one skilled in the art will appreciate, the local slant stacking is accomplished in the common-offset domain but, not in the common-midpoint domain. In one embodiment of the present invention, an assumption is made that stacking velocities describe the dip of primary events in common-midpoint ("CMP") gathers. In general, stacking velocities are a reasonable description of primaries from geological structures above the subsurface salt formations, which can reverberate in marine environments to become the strongest multiples.

Figure 4:
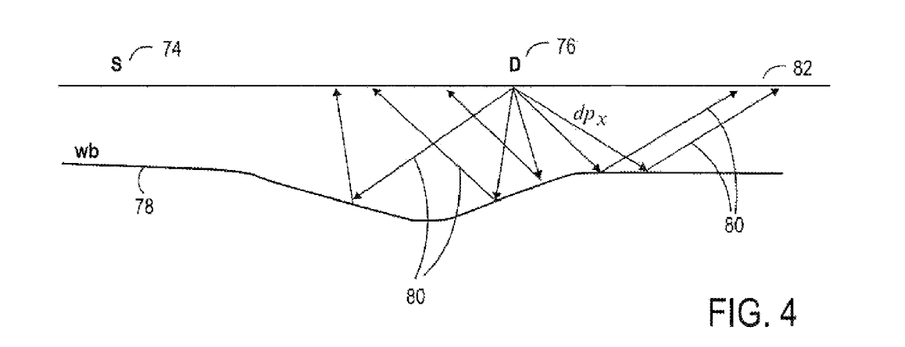
FIG. 4 illustrates one embodiment of the present invention wherein rays are sprayed from a detector location and are reflected off the water bottom surface of a marine environment.
Figure 5:
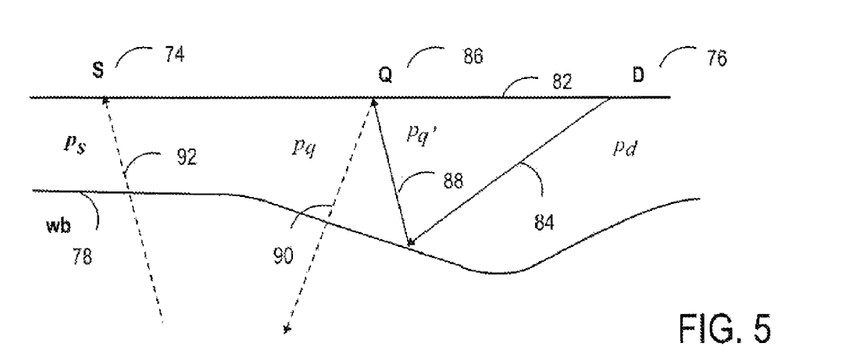
FIG. 5 illustrates one embodiment of me present invention wherein a primary beam corresponding to a given pegleg is determined through raytracing.
Figure 6:
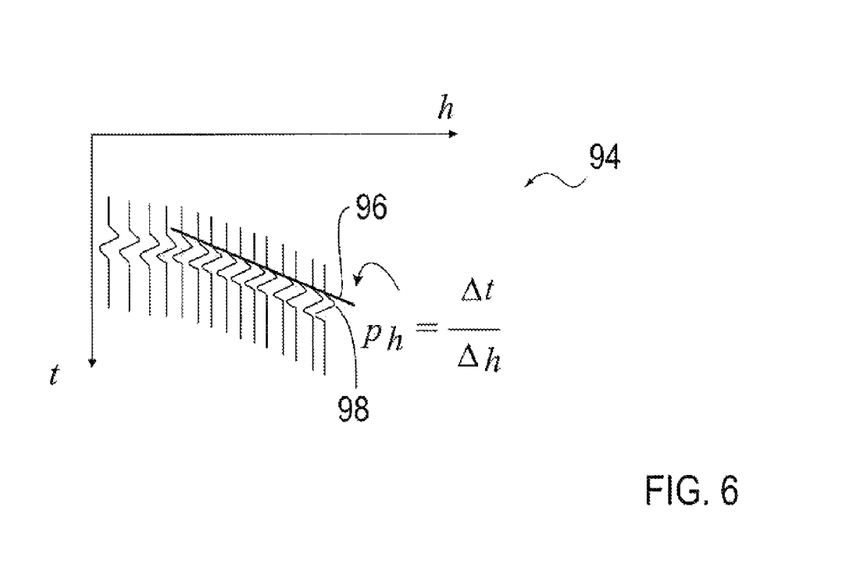
FIG. 6 illustrates a method utilized by one embodiment of the present invention to determine the stationary pegleg.

FIGS. 4, 5 and 6 illustrate me manner in which this embodiment of the present invention calculates the raytrace traveltime for the determination of the stationary pegleg. An input beam is selected with a source location "S" 74 and a detector location "D" 76 as illustrated in FIG. 4. A multiple generating surface is determined, in this embodiment it is the water bottom ("wb") 78. Rays 80 are sprayed from the detector D 76 which are reflected back from the multiple-generating surface wb 78 and reach the free surface 82. The angular interval for the rays 80 is predetermined to be $dp_x$ in the x (vertically downward from the free surface 82) direction and $dp_y$ in the y direction (perpendicular to the sheet). An individual ray 84 is selected with a given ray parameter or detector raypath dip $p_d$ and an arrival location Q 86 of the ray 84 is determined at the free surface 82 as illustrated in FIG. 5. The arrival direction (ray parameter $p_q$, 88) of the ray 84 is determined at the arrival location Q 86. The reflection at location Q 86 is determined and an outgoing ray parameter $p_q$ 90 is calculated. The locations S 74 and Q 86 and their ray parameters $p_s$ 92 and $p_q$ 90 determine the primary corresponding to the pegleg with locations D 76 and Q 86 and ray parameters $p_d$ 84 and $p_q$ 88.

Finding the stationary raypaths that describe the reflection at location Q 86 requires a raypath search. The search is performed to find the separate reflections that occur at the various locations S 74, Q 86 and D 76. In this particular embodiment, the search compares the ray traced $p_h$ with the calculated $p_h$ ($p_h$ being the offset dip). The raytraced $p_h$ calculated as;

$$p_h = p_q - p_s$$

$$p_m = p_q + p_s$$

where $p_m$ (the midpoint dip) at a given location corresponds to a particular beam. The calculated $p_h$ obtained from the normal moveout equation ("NMO"):

$$p_h = \frac{\partial t}{\partial h} = \frac{\partial}{\partial h}\sqrt{T_0^2 + \left(\frac{2h\cos\theta_m}{V}\right)^2}$$

where:
  t is time;
  h is the half offset;
  V is the NMO velocities; and
  $T_o$ is zero-offset traveltime.

V and $T_o$ are derived from the stacking velocities obtained from the earth model. FIG. 6 illustrates the determination of $p_h$ where $p_h$ is the local slope 96 of the curve 98 in the h-t plot 94. The beam with the closest match between the raytraced $p_h$ and the calculated $p_h$ is selected as the stationary pegleg.

Figure 7:
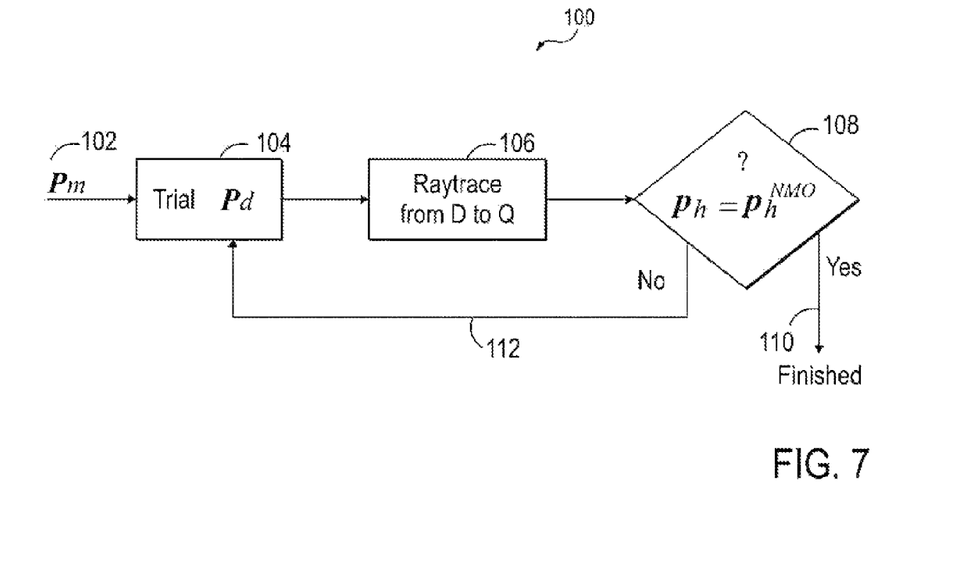
FIG. 7 illustrates a schematic drawing of the above method of determining the stationary pegleg used by one embodiment of the present invention.

FIG. 7 illustrates a schematic of the method 100 in which the stationary pegleg is determined by this embodiment of the present invention. A midpoint dip $p_m$ is selected 102, and a trial direction $p_d$ is selected from the detector location D that corresponds to the $p_m$ is chosen 104. The parameter $p_d$ is used to perform a raytrace from the detector location D to a point Q selected between the source location S and the detector location D 106. The raytrace results in a raytraced offset dip $p_h$ which is compared to a calculated offset dip $p_h$ 108, if the raytraced $p_h$ closely matches the calculated $p_h$ then this process is complete and the beam corresponding to $p_m$ is selected as the stationary pegleg 110. If the raytraced $p_h$ does not match the calculated $p_h$ then another trial direction $p_d$ is chosen and the process is performed again 112 until a satisfactory match between the raytraced $p_h$ and the calculated $p_h$ is obtained.

Figure 8:
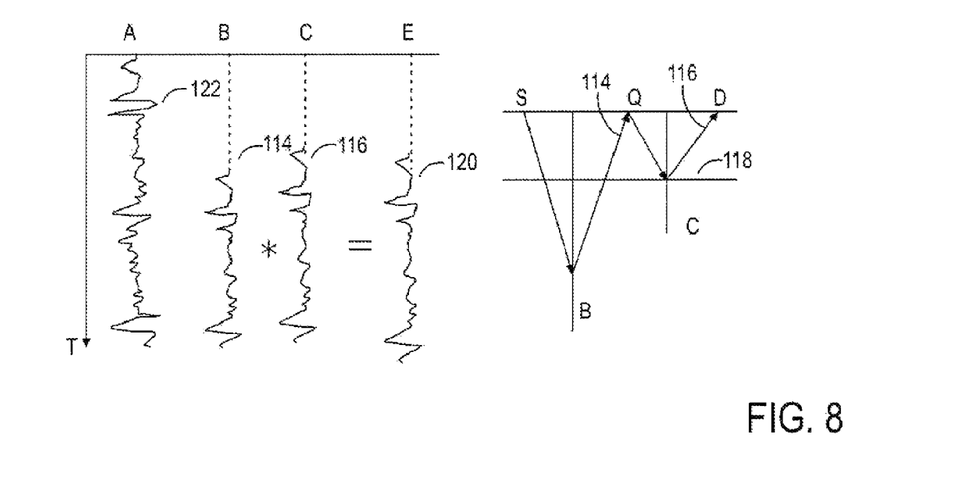
FIG. 8 illustrates one embodiment of the present invention wherein the primary beam is being convolved with the pegleg beam.

This embodiment of the present invention also includes convolving the predicted multiples beam with a segment of the modeled beam to obtain the convolved multiples beam. As illustrated in FIG. 8, the predicted multiples beam B 114 is convolved with the a segment of the modeled pegleg beam C 116 starting at the multiple-generating surface 118. The result of the convolution is beam E 120 which is the convolved multiples beam that is deconvolved with input beam A 122 to remove multiples that are present in the input beam A 122.

Figure 9:
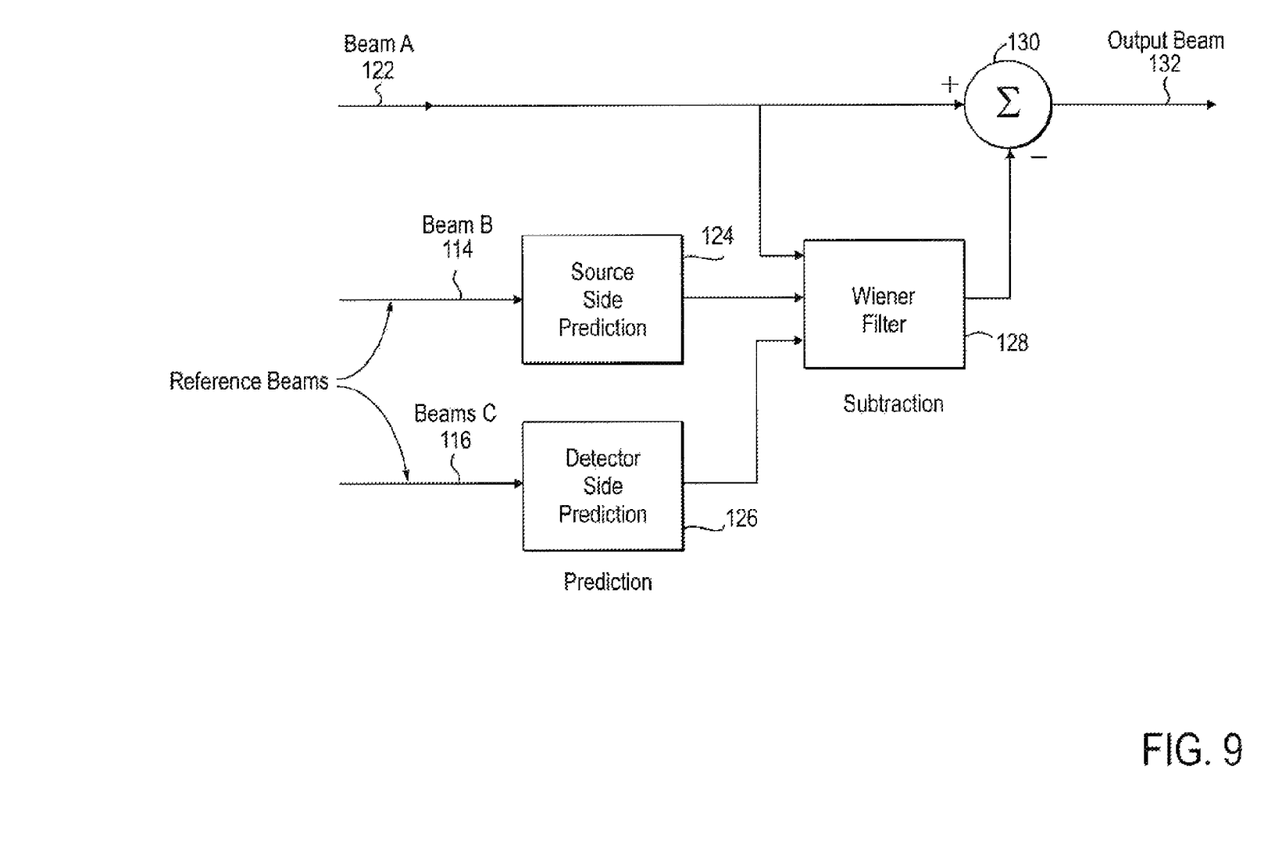
FIG. 9 illustrates a schematic drawing of a single-beam deconvolution that is utilized by one embodiment of the present invention.

A schematic illustration of this embodiment is provided in FIG. 9, wherein beam B 114 is utilized as the source side prediction 124, and beam Q 116 is utilized for the detector side prediction 126. This embodiment utilizes a Wiener Filter 128 and inputs from beams A 122, B 114 and C 116 to generate an estimation of the multiples present in beam A 122. A Wiener filter is known in the art. In general, it is a causal filter which will transform an input into a desired output as closely as possible, subject to certain constraints. As one skilled in the art will appreciate there are other filters or means that can perform this particular function and they are intended to be within the scope of the present invention. Once the multiples in Beam A 122 have been determined, the multiples are then removed 130 from Beam A 122.

Figure 10:
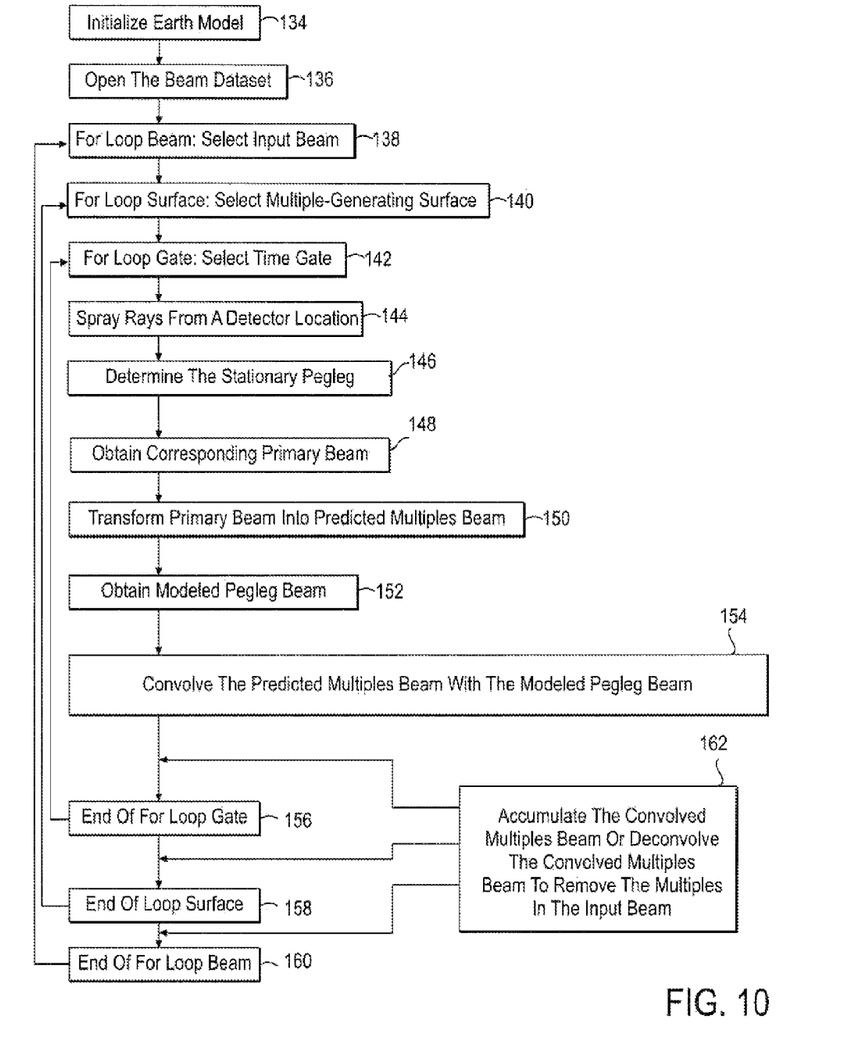
FIG. 10 illustrates a flow chart of another embodiment of the present invention for attenuating multiples in seismic data.

One embodiment of the present invention is illustrated in FIG. 10 wherein an earth model is initialized 134 which correlates to a specific geological region of interest. A beam dataset 136 that has been determined from seismic data of the geological region of interest is also initiated. This embodiment of the present invention includes a series of loops wherein an input beam 138, a multiple-generating surface 140 and a time gate 142 are selected. Rays are sprayed from a detector location that is based on the input beam 144 and a stationary pegleg is selected from one of the rays 146. A primary beam corresponding to the pegleg is obtained 148, and the primary bean is transformed into a predicted multiples beam 150 by a shift corresponding to the traveltime of the ray corresponding to the stationary pegleg. A modeled pegleg beam related to the predicted multiples beam is then generated 152. A segment of the modeled pegleg beam which starts at the multiple-generating surface is convolved with the predicted multiples beam to obtain a convolved multiples beam 154. The convolved multiples beam is then either accumulated or deconvolved with the input beam to remove the multiples in the input beam 162. The accumulated beams can be used to reconstruct the multiple prediction as a seismic trace or be used to deconvolve with the input beam at a later time.

This embodiment of the present invention allows a number of different points after convolution to either accumulate the convolved multiples, beam or deconvolve the convolved multiples beam to remove the multiples in the input beam 162. Depending on the data being processed, those steps can occur before the end of the For loop for selecting the time gate 142-156 or immediately after that loop 142-156. Those steps can also occur after For loop for selecting the multiple-generating surface 140-158 or after the For loop for selecting the input beam 138-160.

Figure 11:
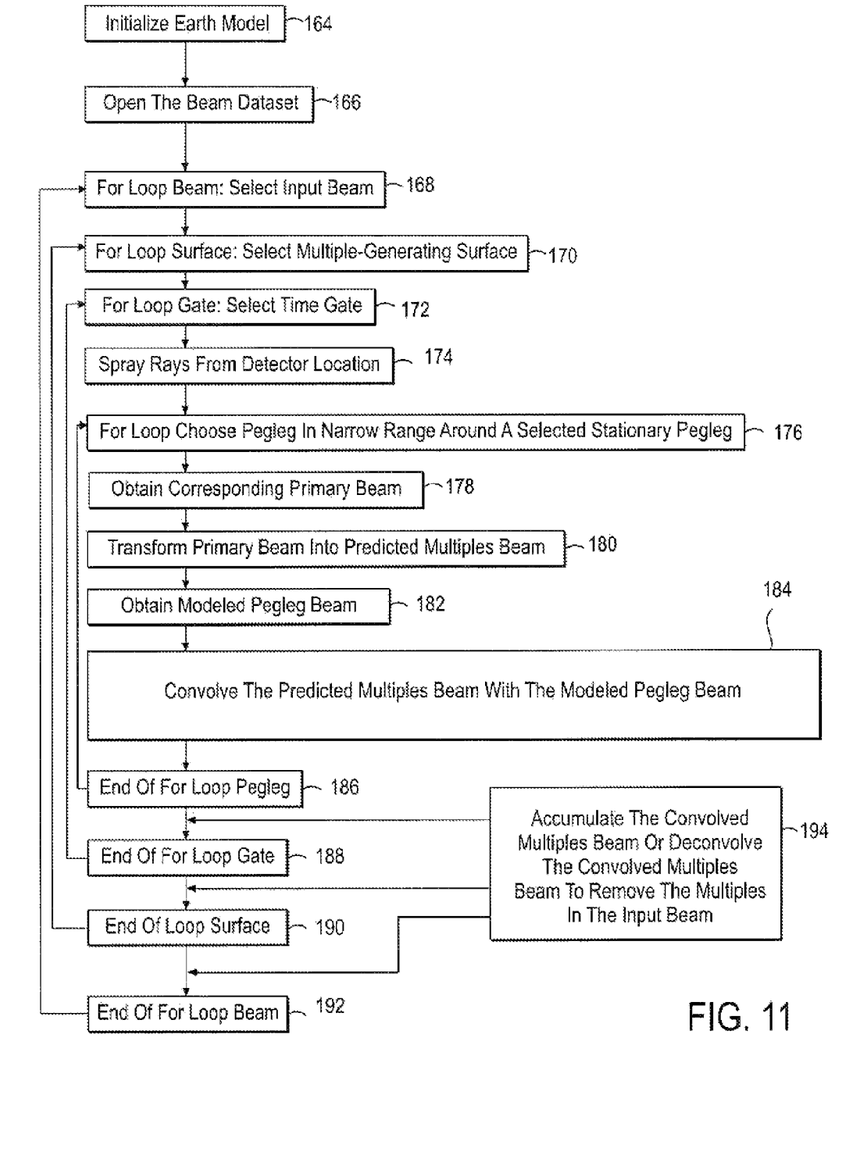
FIG. 11 illustrates a flow chart of a further embodiment of the present invention for attenuating multiples in seismic data.

Another embodiment of the present invention is illustrated in FIG. 11, wherein an earth model is initialized 164 which correlates to a specific geological region of interest. A beam dataset 166 that has been determined from seismic data of the geological region of interest is also initiated. This embodiment of the present invention includes a series of loops wherein an input beam 168, a multiple-generating surface 170 and a time gate 172 are selected. Rays are sprayed from a detector location that is based on the input beam 174 and a pegleg which is in a narrow range around a selected stationary pegleg 176 is selected. A primary beam which corresponds to the chosen pegleg is obtained 178, and that primary beam is transformed into a predicted multiples beam 180. The modeled pegleg beam which relates to the predicted multiples beam is obtained 182. The predicted multiples beam is then convolved with a segment of the modeled pegleg beam to obtain a convolved multiples beam 184. The segment of the modeled pegleg beam utilized by this step starts at the multiple-generating surface and ends at the detector location.

Within the For loop for selecting the pegleg 176-186, the predictions or convolved multiples beam for the narrow range around the stationary are stacked. The steps of accumulating the convolved multiples beam or deconvolving the convolved multiples beam to remove the multiples in the input beam 194 can occur in this embodiment after the For loop for selecting, the pegleg 176-186, the For loop for selecting the time gate 172-188, the For loop for selecting the multiple-generating surface 170-190, or the For loop for selecting the input beam 168-192.

Figure 12:
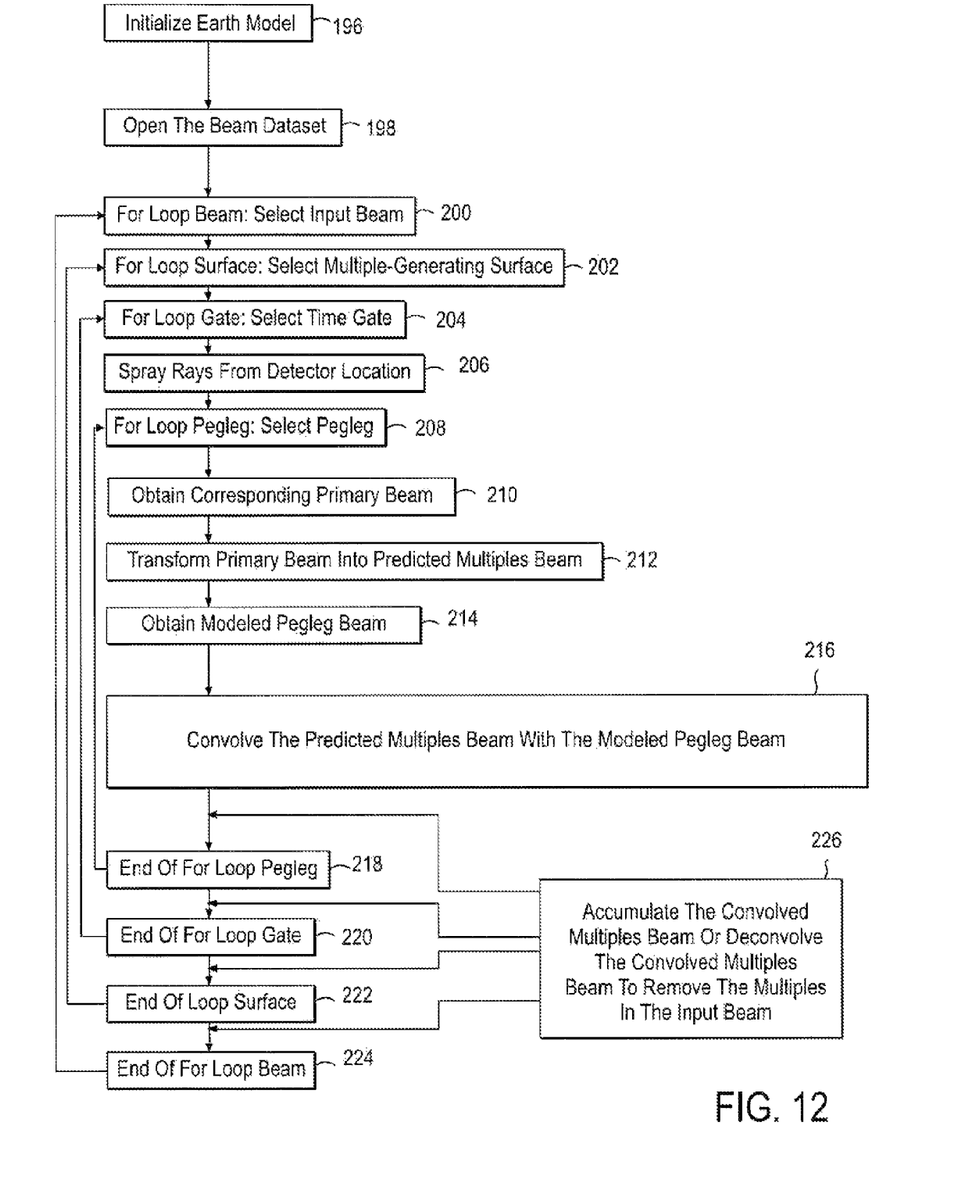
FIG. 12 illustrates a flow chart of one embodiment of the present invention for attenuating multiples in seismic data.

Another embodiment of the present invention is illustrated in FIG. 12, wherein an earth model is initialized 196 which correlates to a specific geological region of interest. A beam dataset 198 that has been determined from seismic data of the geological region of interest is also initiated. Rays are sprayed from a detector location that is based on the input beam 206 and the pegleg that is selected 208 is not tied to a stationary pegleg. That pegleg is used to obtain a corresponding primary beam 210. The primary beam is transformed into a predicted multiples beam 212 and a modeled pegleg beam is obtained 214. A segment of the modeled pegleg beam that starts at the multiple-generating surface is convolved with the predicted multiples beam to obtain a convolved multiples beam 216. The convolved multiples beams that are generated within the For loop pegleg 208-218 are accumulated. In this embodiment, the steps or accumulating the convolved multiples beam or deconvolving the convolved multiples beam to remove the multiples in the input beam 226 can occur in this embodiment after the For loop for selecting the pegleg 208-218, the For loop for selecting the time gate 204-220, the For loop for selecting the multiple-generating surface 202-222, or the For loop for selecting the input beam 200-224.

Both the stationary pegleg and the pegleg can be determined for a variety of multiples. One embodiment of the present invention determines the stationary pegleg or pegleg for a source-side multiple. Another embodiment determines the stationary pegleg or pegleg for a detector-side multiple. A further embodiment determines the stationary pegleg or pegleg for both source-side and the detector-side multiples.

Figure 13:
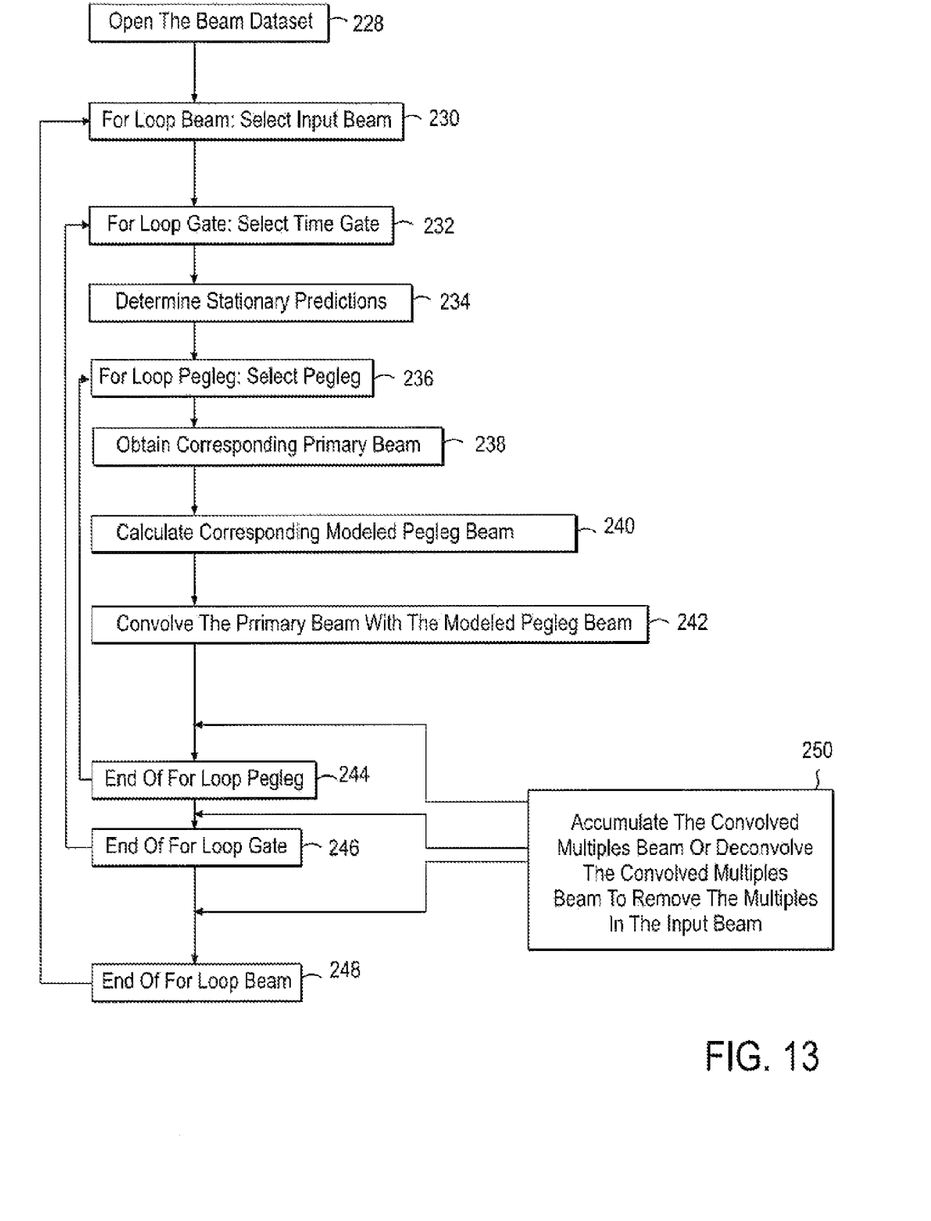
FIG. 13 illustrates a flow chart of another embodiment of the present invention for attenuating multiples in seismic data.

As one skilled in the art will appreciate, there may be situations in which an earth model is not readily available, in such instances, the present invention is still able to predict and attenuate multiples. One embodiment of the present invention does not include the use of an earth model. In that embodiment, an input beam is selected 230 from an opened beam dataset 228 as illustrated in FIG. 13. A time gate is selected 232 and the pegleg selection 236 is aided by an a-priori determination of stationary predictions 234, such as assuming a layered earth model or determining the areal coverage of the source and detector locations. A pegleg is selected 236 and a primary beam corresponding to the pegleg is obtained 238. A modeled pegleg beam corresponding to the primary beam is calculated 240, and the primary beam is convolved with the modeled pegleg beam 242. The above-described steps can either be repeated, 230-248, 232-246, 336-244 with the convolved multiples beam being accumulated or the convolved multiples beam is deconvolved with the input beam to remove the multiples from the input beam 250.

Figure 14:
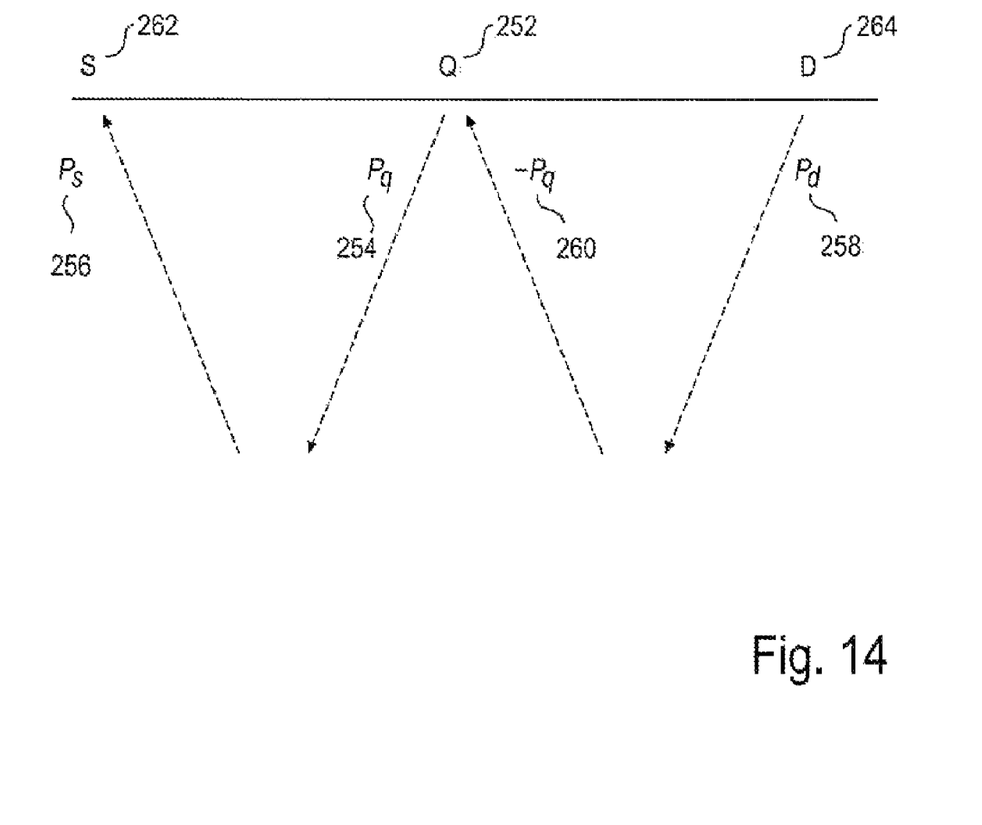
FIG. 14 illustrates one embodiment of the invention wherein a primary beam corresponding to a pegleg is determined without raytracing.

The above-described embodiment convolves a plurality of primary and pegleg beams for a range of locations Q 252 and a range of ray parameter values $P_q$ 254 and $P_s$ 256 as illustrated in FIG. 14. The range of Q 252 and the ranges $P_q$ 254 and $P_s$ 256 (or $P_d$ 258) is predetermined from an analysis of the input data. The ranges are determined so that enough beams are included to contain the stationary contribution for the modeled multiples that is amplified after summation of the stationary contribution with other non-stationary contributions. In FIG. 14 a beam with a given ray parameter $P_m=P_s$ 280+$P_d$ 258, a location Q 252, and ray parameters $P_q$ 254 and $P_s$ 256 (or $P_d$ 258) are selected. The primary beam, $P_{m1}=P_s$ 256+$P_q$ 254, and the pegleg beam, $P_{m2}=P_d$ 258+$P_q$ 254, are determined. In this embodiment, there is an assumption made that the surface reflection at Q 252 is from $P_q$ 254 to $-P_q$ 260. The primary beam can then be convolved with the pegleg beam. In this embodiment, the primary beam and the pegleg beam are convolved for a range of location Q 252 values beginning at Q 252=(S 262+264)/2 or some other predetermined locations. In addition, the primary beam and the pegleg beam are convolved for a range of ray parameter $P_q$ 254 values.

As described-above, the embodiments of the present invention depicted in FIGS. 10-13 incorporate loops which illustrate that certain steps of those embodiments can be repeated depending on the data which is being processed.

Certain embodiments of the present invention described-above include spraying rays from the detector location to select the stationary pegleg or peglegs, it should be understood that there are another means of selecting the stationary pegleg or pegleg, for example, random selection, and those means are considered to within the scope of the present invention.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

What is claimed is:

1. A computer-implemented method of attenuating multiples in multiply-reflected, surface-related seismic waves within the earth's subsurface utilizing a computer system comprising at least one processor configured to communicate with at least one computer memory device and configured for executing computer program code for performing the method comprising:
   (a) initializing an earth model, on at least one processor of the computing system, related to a geological volume within the earth's subsurface;
   (b) selecting a beam dataset, stored on at least one memory device, derived from seismic data related to the geological volume;
   (c) selecting an input beam from the beam dataset;
   (d) selecting a multiple-generating surface from the earth model;
   (e) selecting a time gate;
   (f) executing computer program code, on at least one processor of the computing system, configured for determining a stationary pegleg utilizing the input beam, the multiple-generating surface and the time gate;
   (g) executing computer program code, on at least one processor of the computing system, configured for obtaining a primary beam which corresponds to the stationary pegleg;
   (h) executing computer program code, on at least one processor of the computing system, configured for obtaining a modeled pegleg beam that is related to the primary beam;
   (i) executing computer program code, on at least one processor of the computing system, configured for convolving the primary beam and the modeled pegleg beam to obtain a convolved multiples beam;
   (j) executing computer program code, on at least one processor of the computing system, configured for deconvolving the convolved multiples beam with the input beam to remove the multiples in the input beam; and
   (k) repeating steps (c) to (j) for a plurality of beams, steps (d) to (j) for a plurality of multiple-generating surfaces, and steps (e) to (j) for a plurality of time gates, to generate an image of the geological volume.

2. The method of claim 1 which includes accumulating the convolved multiples beams before deconvolving the input beam with the convolved multiples beam to remove the multiples in the input beam.

3. The method of claim 1 wherein the step of selecting the time gate includes selecting the entire input beam.

4. The method of claim 1 wherein the step of selecting the time gate includes selecting a portion of the input beam.

5. The method of claim 1 wherein the stationary pegleg is determined for a source-side multiple.

6. The method of claim 1 wherein the stationary pegleg is determined for a detector-side multiple.

7. The method of claim 1 wherein the stationary pegleg is determined for both a source-side multiple and a detector-side multiple.

8. The method of claim 1 wherein determining the stationary pegleg includes spraying rays from a detector location, the detector location being based on the input beam, and determining a stationary pegleg that is related to one of the rays sprayed from the detector location.

9. The method of claim 1 wherein convolving the primary beam and the modeled pegleg beam to obtain the convolved multiples beam includes transforming the primary beam into a predicted multiples beam, and convolving the predicted multiples beam with a segment of the modeled pegleg beam to obtain a convolved multiples beam, the segment of the modeled pegleg beam starting at the multiple-generating surface and ending at a deeper surface or at the end of a predetermined time interval.

10. The method of claim 1 wherein the convolved multiples beam is obtained as a direct convolution of the primary beam with the modeled pegleg beam.

11. The method of claim 1 wherein the beams are defined as energy components that are partially localized in space and dip.

12. The method of claim 1 wherein the beam dataset includes Gaussian beams.

13. The method of claim 1 wherein the beam dataset includes beams with complex rays.

14. The method of claim 1 wherein the beam dataset includes controlled beams.

15. The method of claim 1 wherein the beam dataset includes finite-difference beams.

16. A computer-implemented method of attenuating multiples in multiply-reflected, surface-related seismic waves within the earth's subsurface utilizing a computer system comprising at least one processor configured to communicate with at least one computer memory device and configured for executing computer program code for performing the method comprising:
   (a) initializing an earth model, on at least one processor of the computing system, related to a geological volume within the earth's subsurface;
   (b) selecting a beam dataset, stored on at least one memory device, derived from seismic data related to the geological volume;
   (c) selecting an input beam from the beam dataset;
   (d) selecting a multiple-generating surface from the earth model;
   (e) selecting a time gate;
   (f) selecting a pegleg;

(g) executing computer program code, on at least one processor of the computing system, configured for obtaining a primary beam which corresponds to the pegleg;
(h) executing computer program code, on at least one processor of the computing system, configured for obtaining a modeled pegleg beam that is related to the primary beam;
(i) executing computer program code, on at least one processor of the computing system, configured for convolving the primary beam and the modeled pegleg beam to obtain a convolved multiples beam;
(j) executing computer program code, on at least one processor of the computing system, configured for deconvolving the convolved multiples beam with the input beam to remove the multiples in the input beam; and
(k) repeating steps (c) to (j) for a plurality of beams, steps (d) to (j) for a plurality of multiple-generating surfaces, and steps (e) to (j) for a plurality of time gates, to generate an image of the geological volume.

17. The method of claim 16 which includes accumulating the convolved multiples beams before deconvolving the input beam with the convolved multiples beam to remove the multiples in the input beam.

18. The method of claim 16 wherein the step of selecting the time gate includes selecting the entire input beam.

19. The method of claim 16 wherein the step of selecting the time gate includes selecting a portion of the input beam.

20. The method of claim 16 wherein the pegleg is selected for a source-side multiple.

21. The method of claim 16 wherein the pegleg is selected for a detector-side multiple.

22. The method of claim 16 wherein the pegleg is selected for both a source-side multiple and a detector-side multiple.

23. The method of claim 16 wherein a stationary pegleg utilizing the input beam, the multiple-generating surface and the time gate is determined, and the selected pegleg is related to the stationary pegleg.

24. The method of claim 23 wherein the stationary pegleg is determined for a source-side multiple.

25. The method of claim 23 wherein the stationary pegleg is determined for a detector-side multiple.

26. The method of claim 23 wherein the stationary pegleg is determined for both a source-side multiple and a detector-side multiple.

27. The method of claim 23 wherein the pegleg is chosen by selecting a range of ray parameter values around a ray parameter value of the stationary pegleg.

28. The method of claim 23 wherein the pegleg is chosen by selecting a range of locations around an arrival location of the stationary pegleg.

29. The method of claim 16 wherein the beams are defined as energy components that are partially localized in space and dip.

30. The method of claim 16 wherein the beam dataset includes Gaussian beams.

31. The method of claim 16 wherein the beam dataset includes complex beams.

32. The method of claim 16 wherein the beam dataset includes controlled beams.

33. The method of claim 16 wherein the beam dataset includes finite-difference beams.

34. A computer implemented method of attenuating multiples in multiply-reflected, surface-related seismic waves within the earth's subsurface utilizing a computer system comprising at least one processor configured to communicate with at least one computer memory device and configured for executing computer program code for performing the method comprising:
(a) selecting an input beam from a beam dataset, stored on at least one memory device, using a computer;
(b) selecting a time gate;
(c) selecting a pegleg;
(d) executing computer program code, on at least one processor of the computing system, configured for obtaining a primary beam which corresponds to the pegleg;
(e) executing computer program code, on at least one processor of the computing system, configured for obtaining a modeled pegleg beam that is related to the primary beam;
(f) executing computer program code, on at least one processor of the computing system, configured for convolving the primary beam and the modeled pegleg beam to obtain a convolved multiples beam;
(g) executing computer program code, on at least one processor of the computing system, configured for deconvolving the convolved multiples beam with the input beam to remove the multiples in the input beam; and
(h) repeating steps (c) to (g) for a plurality of beams, steps (d) to (g) for a plurality of multiple-generating surfaces, and steps (e) to (g) for a plurality of time gates, to generate an image of the geological volume.

35. The method of claim 34 which includes accumulating the convolved multiples beams before deconvolving the input beam with the convolved multiples beam to remove the multiples in the input beam.

36. The method of claim 34 wherein the step of selecting the time gate includes selecting the entire input beam.

37. The method of claim 34 wherein the step of selecting the time gate includes selecting a portion of the input beam.

38. The method of claim 34 wherein the pegleg is selected for a source-side multiple.

39. The method of claim 34 wherein the pegleg is selected for a detector-side multiple.

40. The method of claim 34 wherein the pegleg is selected for both a source-side multiple and a detector-side multiple.

41. The method of claim 34 wherein the beams are defined as energy components that are partially localized in space and dip.

42. The method of claim 34 wherein the beam dataset includes Gaussian beams.

43. The method of claim 34 wherein the beam dataset includes beams with complex rays.

44. The method of claim 34 wherein the beam dataset includes controlled beams.

45. The method of claim 34 wherein the beam dataset includes finite-difference beams.

* * * * *